(12) United States Patent
Sakai et al.

(10) Patent No.: US 11,815,161 B2
(45) Date of Patent: Nov. 14, 2023

(54) SPEED REDUCER AND MOTOR WITH SPEED REDUCER

(71) Applicant: DENSO CORPORATION, Kariya (JP)

(72) Inventors: Masahito Sakai, Kariya (JP); Kazuki Maruo, Kariya (JP); Tomoki Yamashita, Kariya (JP); Fumihiro Shimizu, Kariya (JP); Hiroyuki Okada, Kariya (JP)

(73) Assignee: DENSO CORPORATION, Kariya (JP)

( * ) Notice: Subject to any disclaimer, the term of this patent is extended or adjusted under 35 U.S.C. 154(b) by 503 days.

(21) Appl. No.: 17/258,912

(22) PCT Filed: Jul. 8, 2019

(86) PCT No.: PCT/JP2019/027008
§ 371 (c)(1),
(2) Date: Jan. 8, 2021

(87) PCT Pub. No.: WO2020/013131
PCT Pub. Date: Jan. 16, 2020

(65) Prior Publication Data
US 2021/0324942 A1 Oct. 21, 2021

(30) Foreign Application Priority Data

Jul. 13, 2018 (JP) ................................. 2018-133039
Jul. 13, 2018 (JP) ................................. 2018-133040
(Continued)

(51) Int. Cl.
*F16H 1/32* (2006.01)
*F16H 35/00* (2006.01)
(Continued)

(52) U.S. Cl.
CPC ............... *F16H 1/32* (2013.01); *H02K 7/116* (2013.01); *B60N 2/0232* (2013.01);
(Continued)

(58) Field of Classification Search
CPC ................. F16H 1/32; F16H 2001/327; F16H 2035/006; B60N 2/1857; B60N 2002/0236
(Continued)

(56) References Cited

U.S. PATENT DOCUMENTS 4,512,213 A * 4/1985 Newton .................... F16H 1/32
475/179
6,280,359 B1 * 8/2001 Moskob .................... F16H 1/32
475/149
(Continued)

FOREIGN PATENT DOCUMENTS

JP 2009-268720 A 11/2009
JP 2013-099085 A 5/2013
(Continued)

OTHER PUBLICATIONS

Aug. 6, 2019 Search Report issued in International Patent Application No. PCT/JP2019/027008.

*Primary Examiner* — Ha Dinh Ho
(74) *Attorney, Agent, or Firm* — Oliff PLC

(57) ABSTRACT

A speed reducer including: a first gear; an eccentric shaft joined to the first gear, the eccentric shaft has first and second supporting portions offset in a rotation radial direction with respect to a first gear rotation shaft; a fixed gear at an eccentric shaft radial direction outer side, and whose rotation is restricted; a transmitting gear supported at the first supporting portion and meshes with the fixed gear, and the transmitting gear revolves around the first gear rotation shaft and rotates around its own axis; an outputting portion
(Continued)

rotating due to the transmitting gear revolving and rotating around its own axis; and a locking gear supported at the second supporting portion and meshes with the fixed gear, and the locking gear revolves around the first gear rotation shaft and rotates around its own axis, and rotation of the outputting portion is restricted.

29 Claims, 7 Drawing Sheets

(30) Foreign Application Priority Data

Feb. 25, 2019 (JP) .................................. 2019-032134
Feb. 25, 2019 (JP) .................................. 2019-032135

(51) Int. Cl.
*B60N 2/18* (2006.01)
*B60N 2/02* (2006.01)
*H02K 7/116* (2006.01)

(52) U.S. Cl.
CPC .... *B60N 2/1857* (2013.01); *B60N 2002/0236* (2013.01); *F16H 2001/327* (2013.01); *F16H 2035/006* (2013.01)

(58) Field of Classification Search
USPC ........................................................... 74/640
See application file for complete search history.

(56) References Cited

U.S. PATENT DOCUMENTS

| | | | |
|---|---|---|---|
| 7,455,613 B2* | 11/2008 | Genter | ...................... F16H 1/32 475/162 |
| 2013/0109526 A1* | 5/2013 | Oishi | ................... H02K 7/1166 475/149 |
| 2019/0356196 A1 | 11/2019 | Izuchi et al. | |

FOREIGN PATENT DOCUMENTS

| | | |
|---|---|---|
| JP | 2018-075999 A | 5/2018 |
| JP | 2018-080791 A | 5/2018 |

* cited by examiner

SPEED REDUCER AND MOTOR WITH SPEED REDUCER

TECHNICAL FIELD

The present disclosure relates to a speed reducer and a motor with a speed reducer.

BACKGROUND ART

Japanese Patent Application Laid-Open (JP-A) No. 2018-80791 discloses a motor with a speed reducer that has a speed reducer that decelerates the rotation of a motor. The speed reducer disclosed in JP-A No. 2018-80791 has a worm that is fixed to the rotation shaft of the motor, a worm wheel that meshes with the worm, a rotating body that, due to the worm wheel rotating, revolves in a state in which rotation around its own axis is restricted, and an output shaft that rotates due to rotational force, which accompanies the revolving of the rotating body, being transmitted thereto. A stopper mechanism is provided between the rotating body and the output shaft. This stopper mechanism is structured to include a driving gear (second gear) that transmits rotational force to the output shaft, and a stopper member. Further, due to a projecting portion that is provided at the driving gear abutting a projecting portion that is provided at the stopper member, rotation of the driving gear is restricted, and the amount of rotation (the rotational angle) of the output shaft is limited to a predetermined amount of rotation.

SUMMARY OF INVENTION

Technical Problem

The speed reducer of JP-A No. 2018-80791 is a useful structure from the standpoints of decelerating the rotation of the output shaft of the motor and the like at a high reduction ratio, and limiting the amount of rotation of the outputting portion (the output shaft) to a predetermined amount of rotation. However, from the standpoints of ease of installation into a vehicle and the like, it is desirable to make the builds of the speed reducer and a motor that is provided with this speed reducer even more compact. Further, in the structure of the speed reducer of JP-A No. 2018-80791, the amount of rotation of the outputting portion (the output shaft) is limited to less than one rotation.

The present disclosure provides a speed reducer and a motor with a speed reducer whose builds may be made to be compact.

Further, the present disclosure provides a speed reducer and a motor with a speed reducer that may limit the amount of rotation of an outputting portion to an amount of rotation that is from less than one rotation to one rotation or more.

Solution to Problem

A first aspect of the present disclosure is a speed reducer including: a first gear that rotates due to rotational force being transmitted thereto; an eccentric shaft that is joined to the first gear, the eccentric shaft having a first supporting portion and a second supporting portion that are offset in a rotation radial direction with respect to a rotation shaft of the first gear; a fixed gear disposed at a radial direction outer side of the eccentric shaft, rotation of the fixed gear being restricted; a transmitting gear that is supported at the first supporting portion and meshes with the fixed gear, wherein, due to the first gear rotating together with the eccentric shaft, the transmitting gear revolves around the rotation shaft of the first gear and rotates around its own axis; an outputting portion that rotates due to the transmitting gear revolving and rotating around its own axis; and a locking gear that is supported at the second supporting portion and meshes with the fixed gear, wherein, due to the first gear rotating together with the eccentric shaft, the locking gear revolves around the rotation shaft of the first gear and rotates around its own axis, and, due to revolving and rotation around its own axis of the locking gear being restrained, rotation of the outputting portion is restricted.

In accordance with the speed reducer of the first aspect, when rotational force is transmitted to the first gear, the first gear rotates together with the eccentric shaft. Due thereto, the transmitting gear, which is supported at the first supporting portion of the eccentric shaft, revolves and rotates around its own axis while remaining meshed with the fixed gear. Further, when the transmitting gear revolves and rotates around its own axis, the outputting portion rotates. Namely, the rotation that is transmitted to the first gear is decelerated by the transmitting gear and the fixed gear, and is transmitted to the outputting portion. Further, when the first gear rotates together with the eccentric shaft, the locking gear, which is supported at the second supporting portion of the eccentric shaft, revolves and rotates around its own axis while remaining meshed with the fixed gear. Further, when the revolving and rotation around its own axis of the locking gear are restrained, rotation of the outputting portion is restricted. Due thereto, the amount of rotation of the outputting portion is limited. Here, in the speed reducer of the first aspect, both the locking gear, which is for limiting the amount of rotation of the outputting portion, and the transmitting gear, which is for transmitting rotational force to the outputting portion, are structures that mesh with the fixed gear. Due thereto, in the speed reducer of the first aspect, the build of the speed reducer can be made to be compact as compared with a case in which the locking gear and the transmitting gear are structures that mesh with respectively different fixed gears.

In a second aspect of the present disclosure, in the first aspect, the transmitting gear and the locking gear may be disposed in a state of being adjacent to and contacting one another in a rotation axial direction of the first gear.

In accordance with the speed reducer of the second aspect, due to the transmitting gear and the locking gear being disposed in a state of being adjacent to and contacting one another in the rotation axial direction of the first gear, the speed reducer may be made to be compact in the rotation axial direction of the first gear.

In a third aspect of the present disclosure, in the above-described aspects, an abutted portion that is abutted by a portion of the locking gear may be provided at the fixed gear, and revolving and rotation of the locking gear around its own axis may be restricted due to the portion of the locking gear abutting the abutted portion.

In accordance with the speed reducer of the third aspect, the abutted portion, which restricts revolving and rotation around its own axis of the locking gear, is provided at the fixed gear. Due thereto, in the speed reducer of the third aspect, the structure of the speed reducer becoming complex may be suppressed, as compared with a case in which the abutted portion, which restricts revolving and rotation around its own axis of the locking gear, is provided separately from the fixed gear.

In a fourth aspect of the present disclosure, in the above-described aspects, a convex portion, which projects-out in a rotation axial direction of the outputting portion, may be provided at one of the transmitting gear or the outputting portion, a concave portion, with which the convex portion engages with a clearance therebetween, may be provided at another of the transmitting gear or the outputting portion, and the outputting portion may rotate due to the transmitting gear revolving or rotating around its own axis in a state in which the convex portion and the concave portion are engaged.

In accordance with the speed reducer of the fourth aspect, the transmitting of rotational force from the transmitting gear to the outputting portion is carried out via the convex portion and the concave portion. Due thereto, in the speed reducer of the fourth aspect, the structures of the transmitting gear and the outputting portion can be simplified as compared with a case in which the transmission of rotational force from the transmitting gear to the outputting portion is carried out by gears.

A fifth aspect of the present disclosure is a speed reducer including: a first gear that rotates due to rotational force being transmitted thereto; an eccentric shaft joined to the first gear, the eccentric shaft having a first supporting portion and a second supporting portion that are offset in a rotation radial direction with respect to a rotation shaft of the first gear; a fixed gear disposed at a radial direction outer side of the eccentric shaft, rotation of the fixed gear being restricted; a transmitting gear that is supported at the first supporting portion and meshes with the fixed gear, wherein, due to the first gear rotating together with the eccentric shaft, the transmitting gear revolves around the rotation shaft of the first gear and rotates around its own axis; an outputting portion that rotates due to the transmitting gear revolving and rotating around its own axis; a locking gear that is supported at the second supporting portion and meshes with the fixed gear, wherein, due to the first gear rotating together with the eccentric shaft, the locking gear revolves around the rotation shaft of the first gear and rotates around its own axis, and, due to revolving and rotation around its own axis of the locking gear being restrained, rotation of the outputting portion is restricted; a first restricting portion that is provided at the locking gear; and a second restricting portion that, due to the first restricting portion abutting the second restricting portion, revolving and rotation around its own axis of the locking gear are restrained.

In accordance with the speed reducer of the fifth aspect, when rotational force is transmitted to the first gear, the first gear rotates together with the eccentric shaft. Due thereto, the transmitting gear, which is supported at the first supporting portion of the eccentric shaft, revolves and rotates around its own axis while remaining meshed with the fixed gear. Further, when the transmitting gear revolves and rotates around its own axis, the outputting portion rotates. Namely, the rotation that is transmitted to the first gear is decelerated by the transmitting gear and the fixed gear, and is transmitted to the outputting portion. Further, when the first gear rotates together with the eccentric shaft, the locking gear, which is supported at the second supporting portion of the eccentric shaft, revolves and rotates around its own axis while remaining meshed with the fixed gear. Further, when the first restricting portion of the locking gear abuts the second restricting portion, and the revolving and rotation around its own axis of the locking gear are restrained, rotation of the outputting portion is restricted. Due thereto, the amount of rotation of the outputting portion is limited. Here, in the speed reducer of the fifth aspect, the locking gear, which is for limiting the amount of rotation of the outputting portion, is provided separately from the transmitting gear, which is for transmitting rotational force to the outputting portion. Due thereto, in the speed reducer of the fifth aspect, the amount of rotation of the outputting portion can be limited to a predetermined amount of rotation of from less than one rotation to one rotation or more, while not being constrained by or while it is difficult to be constrained by the relationship between the transmitting gear and the outputting portion.

In a sixth aspect of the present disclosure, in the above-described fifth aspect, a number of teeth of the locking gear may be set to a number that is greater than a number of teeth of the transmitting gear.

In accordance with the speed reducer of the sixth aspect, the number of teeth of the locking gear is set to a number that is greater than the number of teeth of the transmitting gear. Due thereto, the rotational frequency of the locking gear at the time when the first gear rotates can be made to be lower than the rotational frequency of the transmitting gear. Due thereto, as compared with a case in which the number of teeth of the locking gear is set to a number that is lower than the number of teeth of the transmitting gear, the rotational frequency of the outputting portion, up until the first restricting portion of the locking gear abuts the second restricting portion, can be made to be high. As a result, the speed reducer of the sixth aspect can make it easy to limit the amount of rotation of the outputting portion to an amount of rotation that is one rotation or more.

In a seventh aspect of the present disclosure, in the above-described fifth aspect, a number of teeth of the locking gear may be set to a number that is lower than a number of teeth of the transmitting gear.

In accordance with the speed reducer of the seventh aspect, the number of teeth of the locking gear is set to a number that is lower than the number of teeth of the transmitting gear. Due thereto, the rotational frequency of the locking gear at the time when the first gear rotates can be made to be greater than the rotational frequency of the transmitting gear. Due thereto, as compared with a case in which the number of teeth of the locking gear is set to a number that is greater than the number of teeth of the transmitting gear, the rotational frequency of the outputting portion, up until the first restricting portion of the locking gear abuts the second restricting portion, can be made to be low. As a result, the speed reducer of the seventh aspect can make it easy to limit the amount of rotation of the outputting portion to an amount of rotation that is less than one rotation.

In an eighth aspect of the present disclosure, in the above-described fifth aspect through seventh aspect, the second restricting portion may be provided at the fixed gear, and the first restricting portion and the second restricting portion may abut at a side at which the second supporting portion is offset with respect to the rotation shaft of the first gear.

In accordance with the speed reducer of the eighth aspect, when the first restricting portion of the locking gear abuts the second restricting portion of the fixed gear, and the revolving and rotation around its own axis of the locking gear are restrained, rotation of the outputting portion is restricted. Here, the first restricting portion and the second restricting portion abut one another at the side at which the second supporting portion is offset with respect to the rotation shaft of the first gear. Due thereto, in the speed reducer of the eighth aspect, the contact surface area between the first restricting portion and the second restricting portion can be ensured easily.

A ninth aspect of the present disclosure is a motor with a speed reducer, including: a motor having a rotation shaft; a first gear that rotates due to rotational force of the rotation shaft being transmitted thereto; an eccentric shaft joined to the first gear, the eccentric shaft having a first supporting portion and a second supporting portion that are offset in a rotation radial direction with respect to a rotation shaft of the first gear; a fixed gear disposed at a radial direction outer side of the eccentric shaft, rotation of the fixed gear being restricted; a transmitting gear that is supported at the first supporting portion and meshes with the fixed gear, wherein, due to the first gear rotating together with the eccentric shaft, the transmitting gear revolves around the rotation shaft of the first gear and rotates around its own axis; an outputting portion that rotates due to the transmitting gear revolving and rotating around its own axis; and a locking gear that is supported at the second supporting portion and meshes with the fixed gear, wherein, due to the first gear rotating together with the eccentric shaft, the locking gear revolves around the rotation shaft of the first gear and rotates around its own axis, and, due to revolving and rotation around its own axis of the locking gear being restrained, rotation of the outputting portion is restricted.

In accordance with the motor with a speed reducer of the ninth aspect, when the rotational force of the rotation shaft of the motor is transmitted to the first gear, the first gear rotates together with the eccentric shaft. Due thereto, the transmitting gear, which is supported at the first supporting portion of the eccentric shaft, revolves and rotates around its own axis while remaining meshed with the fixed gear. Further, when the transmitting gear revolves and rotates around its own axis, the outputting portion rotates. Namely, the rotation that is transmitted to the first gear is decelerated by the transmitting gear and the fixed gear, and is transmitted to the outputting portion. Further, when the first gear rotates together with the eccentric shaft, the locking gear, which is supported at the second supporting portion of the eccentric shaft, revolves and rotates around its own axis while remaining meshed with the fixed gear. Further, when the revolving and rotation around its own axis of the locking gear are restrained, rotation of the outputting portion is restricted. Due thereto, the amount of rotation of the outputting portion is limited. Here, in the speed reducer of the ninth aspect, both the locking gear, which is for limiting the amount of rotation of the outputting portion, and the transmitting gear, which is for transmitting rotational force to the outputting portion, are structures that mesh with the fixed gear. Due thereto, the build of the speed reducer can be made to be compact as compared with a case in which the locking gear and the transmitting gear are structures that mesh with respectively different fixed gears. As a result, in the motor with a speed reducer of the ninth aspect, the build of the motor with a speed reducer, which has this speed reducer, can be made to be compact.

In a tenth aspect of the present disclosure, in the ninth aspect, the transmitting gear and the locking gear may be disposed in a state of being adjacent to and contacting one another in a rotation axial direction of the first gear.

In accordance with the motor with a speed reducer of the tenth aspect, due to the transmitting gear and the locking gear being disposed in a state of being adjacent to and contacting one another in the rotation axial direction of the first gear, the motor with a speed reducer can be made to be compact in the rotation axial direction of the first gear.

In an eleventh aspect of the present disclosure, in the above-described ninth aspect or tenth aspect, an abutted portion that is abutted by a portion of the locking gear may be provided at the fixed gear, and revolving and rotation of the locking gear around its own axis may be restricted due to the portion of the locking gear abutting the abutted portion.

In accordance with the motor with a speed reducer of the eleventh aspect, the abutted portion, which restricts revolving and rotation around its own axis of the locking gear, is provided at the fixed gear. Due thereto, as compared with a case in which the abutted portion, which restricts revolving and rotation around its own axis of the locking gear, is provided separately from the fixed gear, the structure of the speed reducer becoming complex can be suppressed. As a result, in the motor with a speed reducer of the eleventh aspect, complicating of the structure of a motor with a speed reducer can be suppressed.

In a twelfth aspect of the present disclosure, in the ninth aspect through the eleventh aspect, a convex portion, which projects-out in a rotation axial direction of the outputting portion, may be provided at one of the transmitting gear or the outputting portion, a concave portion, with which the convex portion engages with a clearance therebetween, may be provided at another of the transmitting gear or the outputting portion, and the outputting portion may rotate due to the transmitting gear revolving or rotating around its own axis in a state in which the convex portion and the concave portion are engaged.

In accordance with the motor with a speed reducer of the twelfth aspect, the transmitting of rotational force from the transmitting gear to the outputting portion is carried out via the convex portion and the concave portion. Due thereto, in the motor with a speed reducer of the twelfth aspect, the structures of the transmitting gear and the outputting portion can be simplified as compared with a case in which the transmission of rotational force from the transmitting gear to the outputting portion is carried out by gears.

A thirteenth aspect of the present disclosure is a motor with a speed reducer, including: a motor having a rotation shaft; a first gear that rotates due to rotational force of the rotation shaft being transmitted thereto; an eccentric shaft joined to the first gear, the eccentric shaft having a first supporting portion and a second supporting portion that are offset in a rotation radial direction with respect to a rotation shaft of the first gear; a fixed gear disposed at a radial direction outer side of the eccentric shaft, rotation of the fixed gear being restricted; a transmitting gear that is supported at the first supporting portion and meshes with the fixed gear, wherein, due to the first gear rotating together with the eccentric shaft, the transmitting gear revolves around the rotation shaft of the first gear and rotates around its own axis; an outputting portion that rotates due to the transmitting gear revolving and rotating around its own axis; a locking gear that is supported at the second supporting portion and meshes with the fixed gear, wherein, due to the first gear rotating together with the eccentric shaft, the locking gear revolves around the rotation shaft of the first gear and rotates around its own axis, and, due to revolving and rotation around its own axis of the locking gear being restrained, rotation of the outputting portion is restricted; a first restricting portion that is provided at the locking gear; and a second restricting portion that, due to the first restricting portion abutting the second restricting portion, revolving and rotation around its own axis of the locking gear are restrained.

In accordance with the motor with a speed reducer of the thirteenth aspect, when rotational force of the rotation shaft of the motor is transmitted to the first gear, the first gear rotates together with the eccentric shaft. Due thereto, the transmitting gear, which is supported at the first supporting portion of the eccentric shaft, revolves and rotates around its own axis while remaining meshed with the fixed gear. Further, when the transmitting gear revolves and rotates around its own axis, the outputting portion rotates. Namely, the rotation that is transmitted to the first gear is decelerated by the transmitting gear and the fixed gear, and is transmitted to the outputting portion. Further, when the first gear rotates together with the eccentric shaft, the locking gear, which is supported at the second supporting portion of the eccentric shaft, revolves and rotates around its own axis while remaining meshed with the fixed gear. Further, when the first restricting portion of the locking gear abuts the second restricting portion, and the revolving and rotation around its own axis of the locking gear are restrained, rotation of the outputting portion is restricted. Due thereto, the amount of rotation of the outputting portion is limited. Here, in the speed reducer of the thirteenth aspect, the locking gear, which is for limiting the amount of rotation of the outputting portion, is provided separately from the transmitting gear, which is for transmitting rotational force to the outputting portion. Due thereto, in the speed reducer of the thirteenth aspect, the amount of rotation of the outputting portion can be limited to an amount of rotation of from less than one rotation to one rotation or more, while not being constrained by or while it is difficult to be constrained by the relationship between the transmitting gear and the outputting portion.

In fourteenth aspect of the present disclosure, in the above-described thirteenth aspect, a number of teeth of the locking gear may be set to a number that is greater than a number of teeth of the transmitting gear.

In accordance with the motor with a speed reducer of the fourteenth aspect, the number of teeth of the locking gear is set to a number that is greater than the number of teeth of the transmitting gear. Due thereto, the rotational frequency of the locking gear at the time when the first gear rotates can be made to be lower than the rotational frequency of the transmitting gear. Due thereto, as compared with a case in which the number of teeth of the locking gear is set to a number that is lower than the number of teeth of the transmitting gear, the rotational frequency of the outputting portion, up until the first restricting portion of the locking gear abuts the second restricting portion, can be made to be high. As a result, the motor with a speed reducer of the fourteenth aspect can make it easy to limit the amount of rotation of the outputting portion to an amount of rotation that is one rotation or more.

In a fifteenth aspect of the present disclosure, in the above-described thirteenth aspect, a number of teeth of the locking gear may be set to a number that is lower than a number of teeth of the transmitting gear.

In accordance with the motor with a speed reducer of the fifteenth aspect, the number of teeth of the locking gear is set to a number that is lower than the number of teeth of the transmitting gear. Due thereto, the rotational frequency of the locking gear at the time when the first gear rotates can be made to be greater than the rotational frequency of the transmitting gear. Due thereto, as compared with a case in which the number of teeth of the locking gear is set to a number that is greater than the number of teeth of the transmitting gear, the rotational frequency of the outputting portion, up until the first restricting portion of the locking gear abuts the second restricting portion, can be made to be low. As a result, the motor with a speed reducer of the fifteenth aspect can make it easy to limit the amount of rotation of the outputting portion to an amount of rotation that is less than one rotation.

In a sixteenth aspect of the present disclosure, in the above-described thirteenth aspect through fifteenth aspect, the second restricting portion may be provided at the fixed gear, and the first restricting portion and the second restricting portion may abut at a side at which the second supporting portion is offset with respect to the rotation shaft of the first gear.

In accordance with the motor with a speed reducer of the sixteenth aspect, when the first restricting portion of the locking gear abuts the second restricting portion of the fixed gear, and the revolving and rotation around its own axis of the locking gear are restrained, rotation of the outputting portion is restricted. Here, the first restricting portion and the second restricting portion abut one another at the side at which the second supporting portion is offset with respect to the rotation shaft of the first gear. Due thereto, in the motor with a speed reducer of the sixteenth aspect, the contact surface area between the first restricting portion and the second restricting portion can be ensured easily.

A seventeenth aspect of the present disclosure is a speed reducer including: a first gear that rotates due to rotational force being transmitted thereto; an eccentric shaft joined to the first gear, the eccentric shaft having a first supporting portion and a second supporting portion that are offset in a rotation radial direction with respect to a rotation shaft of the first gear; a fixed gear disposed at a radial direction outer side of the eccentric shaft, rotation of the fixed gear being restricted; an own-axis-rotation limiting member that is engaged with a portion of the fixed gear; a transmitting gear that is supported at the first supporting portion, and whose rotation around its own axis is limited by being engaged with the own-axis-rotation limiting member, wherein, due to the first gear rotating together with the eccentric shaft, the transmitting gear revolves around the rotation shaft of the first gear; an outputting portion that rotates due to the transmitting gear revolving; and a locking gear that is supported at the second supporting portion and meshes with the fixed gear, wherein, due to the first gear rotating together with the eccentric shaft, the locking gear revolves around the rotation shaft of the first gear and rotates around its own axis, and, due to revolving and rotation around its own axis of the locking gear being restrained, rotation of the outputting portion is restricted.

In accordance with the speed reducer of the seventeenth aspect, when rotational force is transmitted to the first gear, the first gear rotates together with the eccentric shaft. Due thereto, the transmitting gear, which is supported at the first supporting portion of the eccentric shaft, revolves in a state in which rotation around its own axis is limited by the own-axis-rotation limiting member. Further, when the transmitting gear revolves, the outputting portion rotates. Namely, the rotation that is transmitted to the first gear is decelerated by the transmitting gear and is transmitted to the outputting portion. Further, when the first gear rotates together with the eccentric shaft, the locking gear, which is supported at the second supporting portion of the eccentric shaft, revolves and rotates around its own axis while remaining meshed with the fixed gear. Further, when the revolving and rotation around its own axis of the locking gear are restrained, rotation of the outputting portion is restricted. Due thereto, the amount of rotation of the outputting portion is limited. Here, in the speed reducer of the seventeenth aspect, both the locking gear, which is for limiting the amount of rotation of the outputting portion, and the own-axis-rotation limiting member, which is for limiting rotation of the transmitting gear around its own axis, are structures that mesh or engage with the fixed gear. Due thereto, in the speed reducer of the seventeenth aspect, the build of the speed reducer can be made to be compact as compared with a case in which the locking gear and the own-axis-rotation limiting member are structures that mesh or engage with respectively different fixed gears.

An eighteenth aspect of the present disclosure is a speed reducer including: a first gear that rotates due to rotational force being transmitted thereto; an eccentric shaft joined to the first gear, the eccentric shaft having a first supporting portion and a second supporting portion that are offset in a rotation radial direction with respect to a rotation shaft of the first gear; a fixed gear disposed at a radial direction outer side of the eccentric shaft, rotation of the fixed gear being restricted; a transmitting gear that is supported at the first supporting portion, wherein, due to the first gear rotating together with the eccentric shaft, the transmitting gear revolves around the rotation shaft of the first gear; an outputting portion that rotates due to the transmitting gear revolving; a locking gear that is supported at the second supporting portion and meshes with the fixed gear, wherein, due to the first gear rotating together with the eccentric shaft, the locking gear revolves around the rotation shaft of the first gear and rotates around its own axis, and, due to revolving and rotation around its own axis of the locking gear being restrained, rotation of the outputting portion is restricted; a first restricting portion that is provided at the locking gear; and a second restricting portion that, due to the first restricting portion abutting the second restricting portion, revolving and rotation around its own axis of the locking gear are restrained.

In accordance with the speed reducer of the eighteenth aspect, when rotational force is transmitted to the first gear, the first gear rotates together with the eccentric shaft. Due thereto, the transmitting gear, which is supported at the first supporting portion of the eccentric shaft, revolves. Further, when the transmitting gear revolves, the outputting portion rotates. Further, when the first gear rotates together with the eccentric shaft, the locking gear, which is supported at the second supporting portion of the eccentric shaft, revolves and rotates around its own axis while remaining meshed with the fixed gear. Further, when the first restricting portion of the locking gear abuts the second restricting portion, and the revolving and rotation around its own axis of the locking gear are restrained, rotation of the outputting portion is restricted. Due thereto, the amount of rotation of the outputting portion is limited. Here, in the speed reducer of the eighteenth aspect, the locking gear, which is for limiting the amount of rotation of the outputting portion, is provided separately from the transmitting gear, which is for transmitting rotational force to the outputting portion. Due thereto, in the speed reducer of the eighteenth aspect, the amount of rotation of the outputting portion can be limited to a predetermined amount of rotation of from less than one rotation to one rotation or more, while not being constrained by or while it is difficult to be constrained by the relationship between the transmitting gear and the outputting portion.

Advantageous Effects of Invention

In accordance with the above-described aspects, the builds of the speed reducer and the motor with a speed reducer relating to the present disclosure may be made to be compact. Further, in accordance with the above-described aspects, the speed reducer and the motor with a speed reducer relating to the present invention may limit the amount of rotation of the outputting portion (an outputting shaft) to from less than one rotation to one rotation or more.

DESCRIPTION OF EMBODIMENTS

First Exemplary Embodiment

Figure 1:
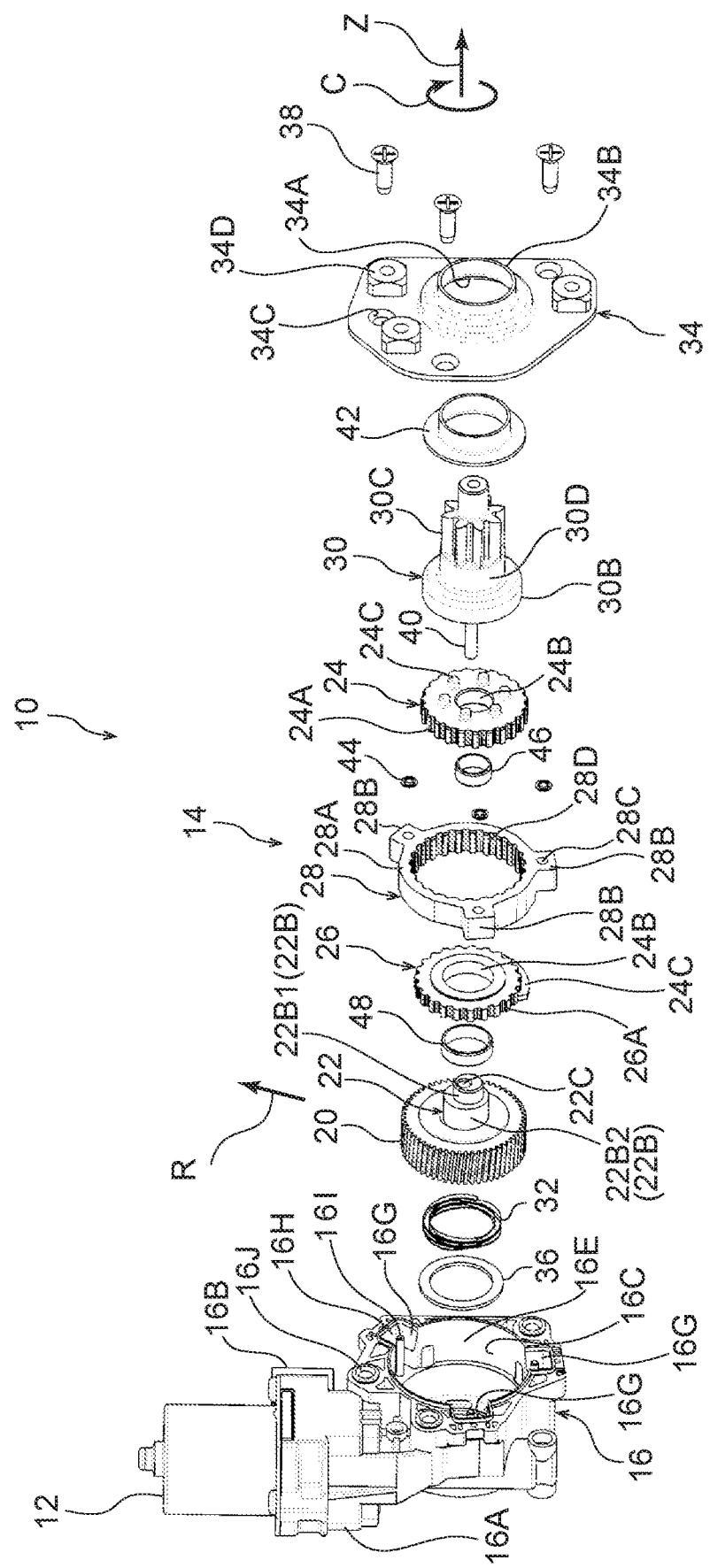
FIG. 1 is an exploded perspective view showing, in an exploded manner, a motor with a speed reducer relating to a first exemplary embodiment.

A motor 10 with a speed reducer relating to a first exemplary embodiment of the present disclosure is described by using FIG. 1 through FIG. 4. Note that the arrow Z direction, the arrow R direction and the arrow C direction that are shown appropriately in the drawings respectively indicate a rotation axial direction one side, the rotation radial direction outer side, and a rotation peripheral direction one side of a pinion gear 30C that is the output gear. Further, the side opposite the arrow Z direction, the side opposite the arrow R direction, and the side opposite the arrow C direction respectively indicate a rotation axial direction another side, the rotation radial direction inner side, and a rotation peripheral direction another side of the pinion gear 30C that is the output gear. Moreover, when simply axial direction, radial direction and peripheral direction are used, they refer to the rotation axial direction, the rotation radial direction and the rotation peripheral direction of the pinion gear 30C, unless otherwise indicated.

Figure 2:
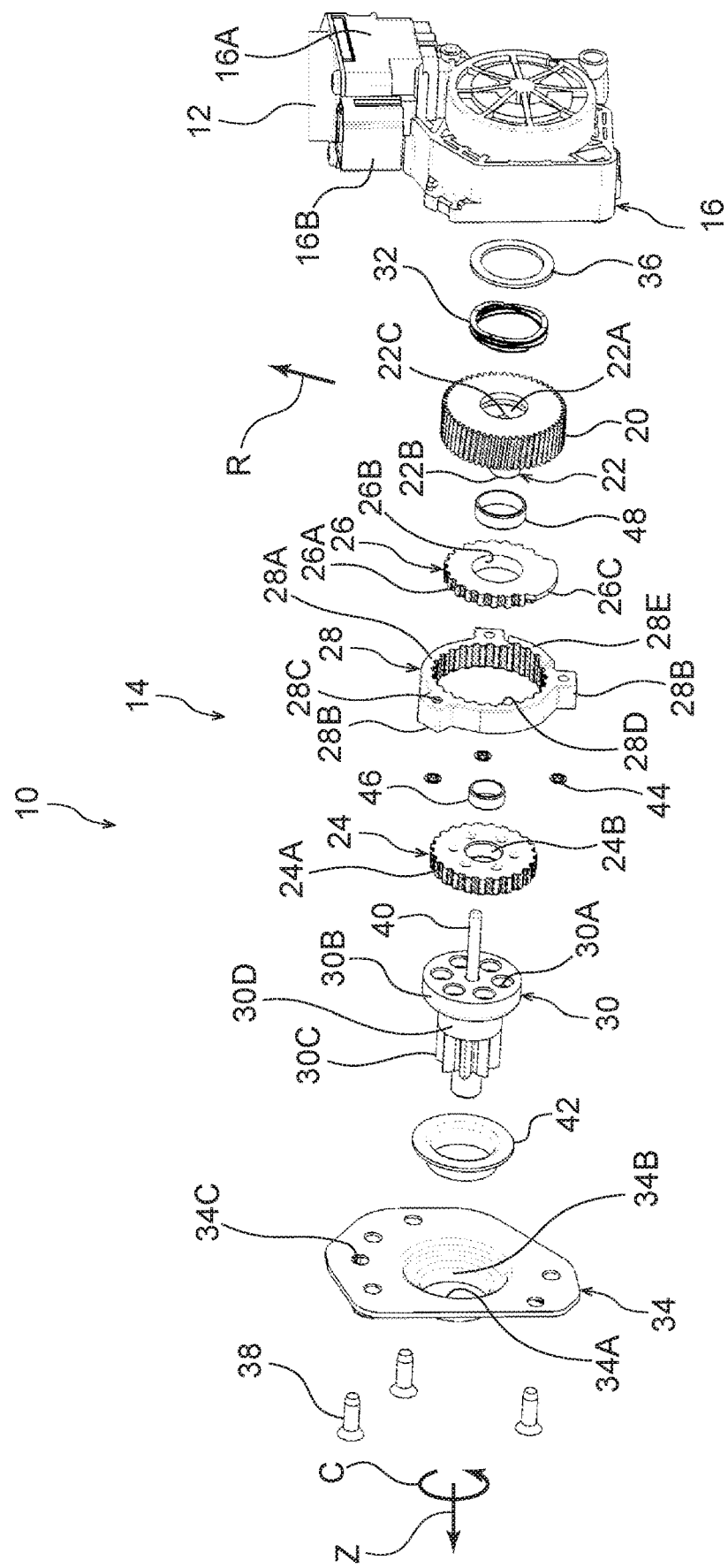
FIG. 2 is an exploded perspective view showing, in an exploded manner, the motor with a speed reducer of the first exemplary embodiment, and is a drawing that is seen from the side opposite FIG. 1.
Figure 3:
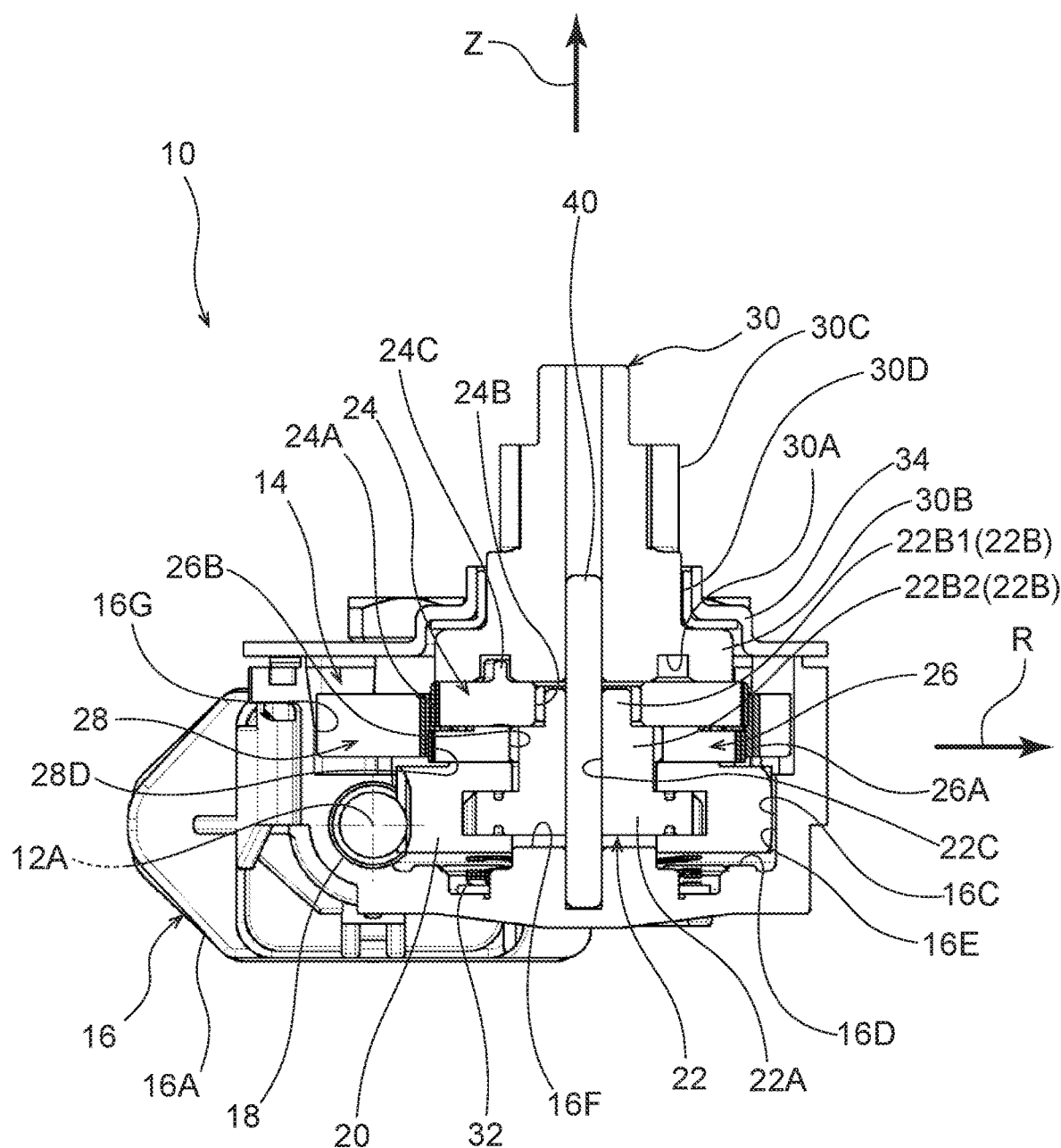
FIG. 3 is a cross-sectional view showing a cross-section in which the motor with a speed reducer of the first exemplary embodiment is cut along a rotation axial direction of an output gear body.

As shown in FIG. 1, FIG. 2 and FIG. 3, the motor 10 with a speed reducer relating to the present exemplary embodiment is a power seat motor for moving a seat cushion of a vehicle seat in the seat vertical direction. This motor 10 with a speed reducer has a motor 12 that is a direct current motor. Further, the motor 10 with a speed reducer has a speed reducer 14 for decelerating and transmitting the rotation of a rotation shaft 12A (see FIG. 3) of the motor 12 to an output gear body 30 that serves as an outputting portion. Moreover, the motor 10 with a speed reducer has a housing 16 to which the motor 12 is mounted and at whose interior the speed reducer 14 is provided.

The speed reducer 14 has a worm gear 18 that is fixed to the rotation shaft 12A of the motor 12, a helical gear 20 that serves as a first gear and meshes with the worm gear 18, and an eccentric shaft 22 that is provided integrally with the helical gear 20.

Further, the speed reducer 14 has a transmitting gear 24 and a locking gear 26 that are supported at the eccentric shaft 22, and a fixed gear 28 that meshes with the transmitting gear 24 and the locking gear 26. Moreover, the speed reducer 14 has the output gear body 30 that engages with the transmitting gear 24, and that has the pinion gear 30C, and whose axial direction faces in the same direction as the axial directions of the transmitting gear 24 and the locking gear 26 (the arrow Z direction and the direction opposite the arrow Z direction).

Further, the motor 10 with a speed reducer has a spring 32 for suppressing rattling in the axial direction of the eccentric shaft 22 and the helical gear 20 and the like. Further, the motor 10 with a speed reducer has a cover plate 34 that, by being fixed to the housing 16, the speed reducer 14 is accommodated within the housing 16.

As shown in FIG. 1 and FIG. 3, the housing 16 is formed by using a resin material. This housing 16 has a motor fixing portion 16A that is fixed in a state in which the rotation shaft 12A of the motor 12 faces in a direction orthogonal to the axial direction (the arrow Z direction), and a connector portion 16B (see FIG. 2) to which is connected an external connector for supplying electricity to the motor 12. Further, the housing 16 has a speed reducer accommodating concave portion 16C in which the speed reducer 14 is accommodated. This speed reducer accommodating concave portion 16C is formed in a concave shape whose axial direction one side (arrow Z direction side) is open.

As shown in FIG. 3, the speed reducer accommodating concave portion 16C is structured to include a bottom wall portion 16D that forms the bottom of the speed reducer accommodating concave portion 16C, and a side wall portion 16E that extends toward the axial direction one side from the outer peripheral portion of the bottom wall portion 16D and whose inner peripheral surface is formed substantially in the shape of a cylindrical surface. A boss portion 16F, which is cylindrical and in which the axial direction another end side end portion of a rotation central shaft 40 that is described later is inserted with clearance, stands erect at the central portion of the bottom wall portion 16D of the speed reducer accommodating concave portion 16C. Further, the spring 32 is disposed around the boss portion 16F at the bottom wall portion 16D. Note that a resin washer 36 is interposed between the bottom wall portion 16D and the spring 32.

As shown in FIG. 1, three fixed gear engaging portions 16G, which restrict rotational displacement of the fixed gear 28 in the peripheral direction due to portions of the fixed gear 28 that is described later being fit-together therewith, are formed at the inner peripheral portion of the side wall portion 16E of the speed reducer accommodating concave portion 16C. The three fixed gear engaging portions 16G are structured by groove portions 16H that are shaped as angular grooves and extend in the axial direction, and pillar portions 16I that are solid cylindrical and stand erect in the axial direction.

Three screw engaging portions 16J are provided at the outer peripheral portion of the open end side of the speed reducer accommodating concave portion 16C at the housing 16. The cover plate 34 is fixed to the housing 16 due to bolts 38 being screwed into these three screw engaging portions 16J.

The cover plate 34 is formed by using a steel plate member or the like. An exposure opening 34A, which is for exposing the pinion gear 30C to the outer side of the speed reducer accommodating concave portion 16C of the housing 16, is formed in this cover plate 34. Further, a rib 34B, which is annular and is bent toward the axial direction another side, is formed at the peripheral edge portion of the exposure opening 34A at the cover plate 34. Bolt insert-through holes 34C through which the bolts 38 are inserted are formed in the cover plate 34. Weld nuts 34D, with which are screwed-together bolts that are for mounting the motor 10 with a speed reducer to a member to be mounted to such as a seat cushion frame or the like, are joined to the cover plate 34.

As shown in FIG. 3, a spiral tooth portion is formed at the outer peripheral portion of the worm gear 18. Due to the motor 12, which is in a state in which the worm gear 18 is fixed to the rotation shaft 12A, being fixed to the housing 16, the worm gear 18 is disposed at the bottom wall portion 16D side of the speed reducer accommodating concave portion 16C and at the inner peripheral surface side of the side wall portion 16E of the housing 16.

As shown in FIG. 1, FIG. 2 and FIG. 3, the helical gear 20 is formed by using a resin material. Plural outer teeth that mesh with the tooth portion of the worm gear 18 are formed at the outer peripheral portion of the helical gear 20. Further, the eccentric shaft 22 that is described later is fixed by insert molding to the axially central portion of the helical gear 20. Further, the helical gear 20 is rotatably supported at the housing 16 via the eccentric shaft 22 and the rotation central shaft 40.

As shown in FIG. 1 and FIG. 3, the eccentric shaft 22 is formed by using a metal material, and can rotate integrally with the helical gear 20 due to a portion of the eccentric shaft 22 being inserted in the helical gear 20. Concretely, the eccentric shaft 22 has a disk portion 22A that is formed in the shape of a disk and extends in the radial direction with the axial direction being the thickness direction thereof. The disk portion 22A is fixed to the inner peripheral portion of the helical gear 20 in a state in which the axial center of this disk portion 22A and the rotational center of the helical gear 20 coincide. Further, the eccentric shaft 22 has a supporting portion 22B that projects-out from the central portion of the disk portion 22A toward the axial direction one side. The axial direction one side at the supporting portion 22B is a first supporting portion 22B1 at which the transmitting gear 24 that is described later is rotatably supported. Further, the axial direction another side at the supporting portion 22B is a second supporting portion 22B2 that is set to have larger diameter than the first supporting portion 22B1 and at which the locking gear 26 that is described later is rotatably supported. The axial centers of the first supporting portion 22B1 and the second supporting portion 22B2 are offset toward a radial direction outer side one direction with respect to the axial center of the disk portion 22A. Note that the direction in which the first supporting portion 22B1 and the second supporting portion 22B2 are offset with respect to the axial center of the disk portion 22A is called the "offset direction D".

A rotation central shaft insert-through hole 22C, which passes-through the disk portion 22A, the first supporting portion 22B1 and the second supporting portion 22B2 in the axial direction and through which the rotation central shaft 40 is inserted, is formed in the eccentric shaft 22. The axial center of this rotation central shaft insert-through hole 22C (the axial center of the rotation central shaft 40 that is inserted-through the rotation central shaft insert-through hole 22C) coincides with the axial center of the disk portion 22A.

As shown in FIG. 2 and FIG. 3, the output gear body 30 is formed by using a metal material. The output gear body 30 has a transmitting gear engaging portion 30B at which are formed plural concave portions 30A that engage with the transmitting gear 24. In the present exemplary embodiment, the six concave portions 30A, whose axial direction another sides are open and that are disposed at a uniform interval in the peripheral direction, are formed in the transmitting gear engaging portion 30B. Further, the output gear body 30 has the pinion gear 30C that is disposed coaxially with the transmitting gear engaging portion 30B at the axial direction one side of the transmitting gear engaging portion 30B, and at whose outer peripheral portion plural outer teeth are formed. Further, the intermediate portion, which is between the transmitting gear engaging portion 30B and the pinion gear 30C, at the output gear body 30 is a shaft-supported portion 30D that is shaft-supported at the rib 34B that is formed at the cover plate 34. Note that a shaft-supporting bush 42 that is formed by using a resin material or the like is engaged with the inner peripheral surface of the rib 34B. Due thereto, contact between the metals of the shaft-supported portion 30D of the output gear body 30 and the rib 34B of the cover plate 34 is prevented or suppressed. Further, the rotation central shaft 40, which is formed in the shape of a rod by using a metal material, is fixed, by press-fitting or the like, into the axially central portion of the output gear body 30.

Figure 4:
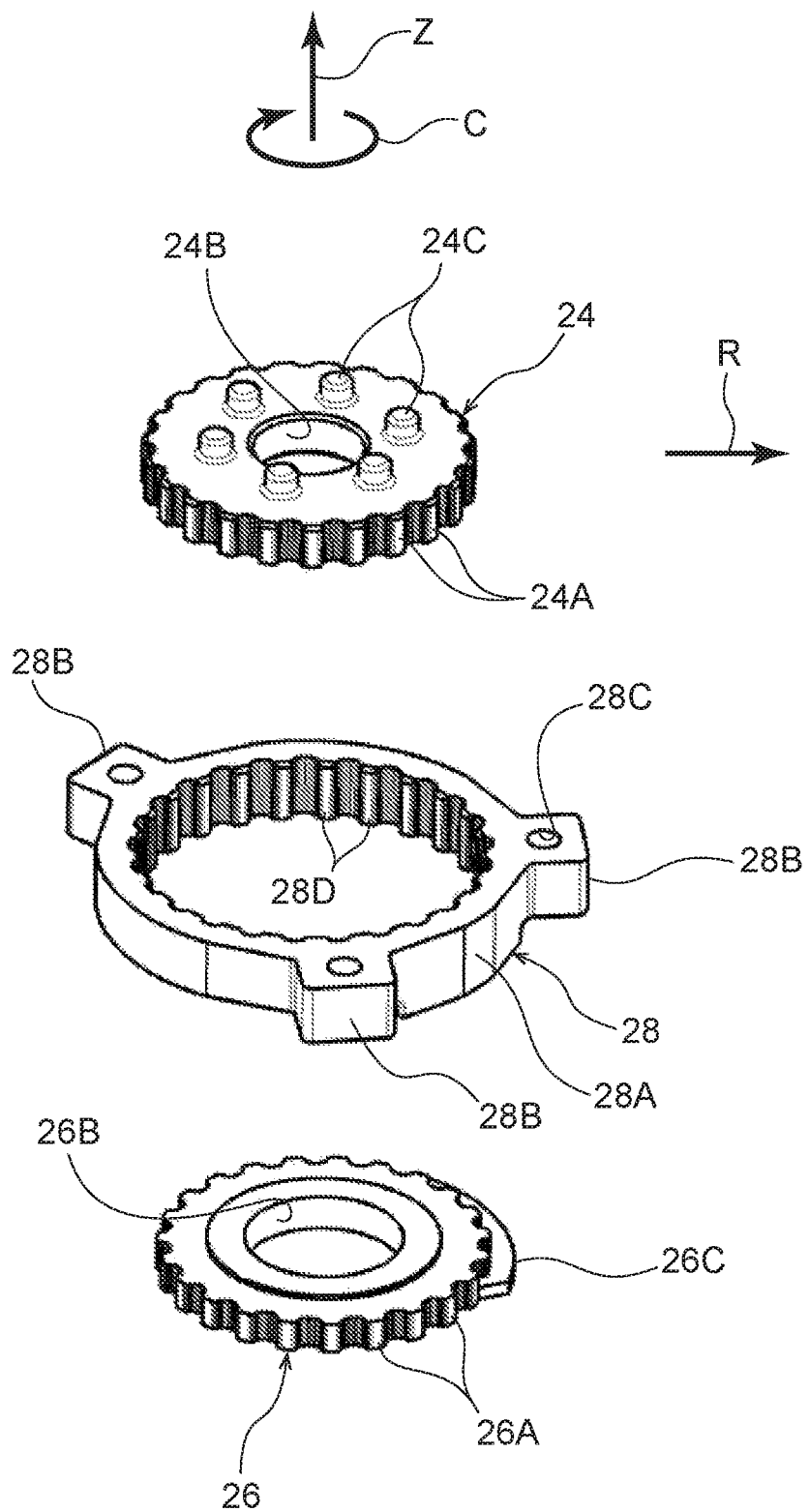
FIG. 4 is a perspective view showing a locking gear, a fixed gear and a transmitting gear.

As shown in FIG. 1 and FIG. 4, the fixed gear 28 is formed due to press working or the like being carried out on a metal material. This fixed gear 28 has a fixed gear main body portion 28A that is formed in an annular shape as seen in the axial direction. Further, the fixed gear 28 has three engaging projecting portions 28B that project-out toward the radial direction outer side from the fixed gear main body portion 28A. Pillar insert-through holes 28C, through which the pillar portions 16I of the housing 16 are inserted, are formed in the engaging projecting portions 28B. Further, the fixed gear 28 is fixed to the housing 16 due to bush nuts 44 being engaged with the pillar portions 16I in the state in which the engaging projecting portions 28B are engaged with the fixed gear engaging portions 16G of the housing 16 (the state in which the engaging projecting portions 28B are disposed within the groove portions 16H, and the pillar portions 16I are inserted-through the pillar insert-through holes 28C).

Further, plural inner teeth 28D, with which the transmitting gear 24 and the locking gear 26 that are described later mesh, are formed at the inner peripheral portion of the fixed gear main body portion 28A.

As shown in FIG. 2, the fixed gear 28 has a second restricting portion 28E that projects-out from the fixed gear main body portion 28A toward the axial direction another side. This second restricting portion 28E projects-out toward the axial direction another side from a peripheral direction one portion of the fixed gear main body portion 28A.

As shown in FIG. 2, FIG. 3 and FIG. 4, the transmitting gear 24 is formed in a disk shape due to press working or the like being carried out on a metal material. Outer teeth 24A that mesh with the inner teeth 28D of the fixed gear 28 are formed at the outer peripheral portion of the transmitting gear 24 over the entire periphery. Further, a supporting hole 24B, which is supported at the first supporting portion 22B1 of the eccentric shaft 22 via the bush 46, is formed in the central portion of the transmitting gear 24. Moreover, the transmitting gear 24 has six convex portions 24C that project-out toward the axial direction one side and are disposed at a uniform interval in the peripheral direction. The outer diameters of these convex portions 24C are set to be inner diameters that are smaller than the inner diameters of the concave portions 30A of the output gear body 30. Due thereto, the convex portions 24C are engaged with the concave portions 30A of the output gear body 30 with clearances therebetween.

The locking gear 26 is formed in a disk shape due to press working or the like being carried out on a metal material, in the same way as the transmitting gear 24. Outer teeth 26B that mesh with the inner teeth 28D of the fixed gear 28 are formed at the outer peripheral portion of the locking gear 26 over the entire periphery. In the present exemplary embodiment, the number of outer teeth 26A of the locking gear 26 is set to a number that is greater than the number of the outer teeth 24A of the transmitting gear 24. Further, a supporting hole 26B, which is supported at the second supporting portion 22B2 of the eccentric shaft 22 via the bush 48, is formed in the central portion of the locking gear 26. Moreover, the locking gear 26 has a first restricting portion 26C that projects-out toward the radial direction outer side and is formed in a fan-shape as seen from the axial direction. This first restricting portion 26C is provided at a peripheral direction one portion of the locking gear 26. Further, in the state in which the outer teeth 26A of the locking gear 26 are meshed with the inner teeth 28D of the fixed gear 28, the first restricting portion 26C is disposed along the axial direction another side surface of the fixed gear main body portion 28A of the fixed gear 28.

Further, as shown in FIG. 3, in the state in which the outer teeth 24A of the transmitting gear 24 are meshed with the inner teeth 28D of the fixed gear 28, and the outer teeth 26A of the locking gear 26 are meshed with the inner teeth 28D of the fixed gear 28, the axial direction another side surface of the transmitting gear 24 and the axial direction one side surface of the locking gear 26 contact one another. Namely, the transmitting gear 24 and the locking gear 26 are disposed so as to be superposed in the axial direction.

(Operation of Present Exemplary Embodiment)

Operation of the present exemplary embodiment is described next.

As shown in FIG. 3, in accordance with the motor 10 with a speed reducer of the present exemplary embodiment, the rotation of the rotation shaft 12A of the motor 12 is decelerated at the speed reducer 14, and is transmitted to the output gear body 30. Namely, when the rotation shaft 12A of the motor 12 rotates, the worm gear 18 rotates. Further, when the worm gear 18 rotates, the helical gear 20 that meshes with the worm gear 18, rotates together with the eccentric shaft 22.

Moreover, when the eccentric shaft 22 rotates, the transmitting gear 24, which is supported at the first supporting portion 22B1 of the eccentric shaft 22, revolves around the rotation central shaft 40 and rotates around its own axis while remaining meshed with the fixed gear 28. Further, when the transmitting gear 24 revolves and rotates around its own axis, the rotational force, which accompanies the rotation around its own axis among the rotational forces that accompany the revolving and the rotation around its own axis, is transmitted from the convex portions 24C of the transmitting gear 24 to the output gear body 30 via the concave portions 30A of the output gear body 30. In detail, due to the outer peripheral surfaces of the convex portions 24C of the transmitting gear 24 pushing the inner peripheral surfaces of the concave portions 30A of the output gear body 30 while slidingly-contacting these inner peripheral surfaces, the rotational force that accompanies the rotation around its own axis, among the rotational forces that accompany the revolving and rotation around its own axis of the transmitting gear 24, is transmitted to the output gear body 30. Due thereto, the output gear body 30 rotates, and the power seat of the vehicle can be operated via a gear that meshes with the pinon gear 30C of the output gear body 30. Here, due to the transmitting of rotational force from the transmitting gear 24 to the output gear body 30 being carried out via the convex portions 24C and the concave portions 30A, the structures of the transmitting gear 24 and the output gear body 30 can be simplified as compared with a case in which the transmitting of rotational force from the transmitting gear 24 to the output gear body 30 is carried out by gears. Note that there may be a structure in which the concave portions 30A are formed at the transmitting gear 24, and the convex portions 24C are formed at the output gear body 30.

Further, when the eccentric shaft 22 rotates, the locking gear 26 that is supported at the second supporting portion 22B2 of the eccentric shaft 22 revolves around the rotation central shaft 40 and rotates around its own axis, while remaining meshed with the fixed gear 28. Further, as shown in FIG. 2 and FIG. 3, when the first restricting portion 26C of the locking gear 26 abuts the second restricting portion 28E of the fixed gear 28, the revolving and rotation around its own axis of the locking gear 26 are restrained. Due thereto, rotation of the eccentric shaft 22 and the helical gear 20 is stopped, and rotation of the output gear body 30 is stopped (rotation is restricted). As a result, excessive force being inputted from the motor 10 with a speed reducer to the vehicle seat is prevented or suppressed, and deterioration of the seating comfort due to members that structure the vehicle seat deforming, or the like, can be prevented or suppressed.

As described above, in the present exemplary embodiment, both the locking gear 26, which is for limiting the amount of rotation of the output gear body 30, and the transmitting gear 24, which is for transmitting rotational force to the output gear body 30, mesh with the single fixed gear 28. Due thereto, as compared with a case in which the locking gear 26 and the transmitting gear 24 are structures that mesh with respectively different fixed gears, the builds of the speed reducer 14 and the motor 10 with a speed reducer which is structured to include this speed reducer 14 can be made to be compact. Further, in the present exemplary embodiment, the transmitting gear 24 and the locking gear 26 are disposed so as to be adjacent to and contact one another in the axial direction. Due thereto, the builds of the speed reducer 14 and the motor 10 with a speed reducer that is structured to include this speed reducer 14, can be made to be even more compact.

Further, in the present exemplary embodiment, the locking gear 26, which is for limiting the amount of rotation of the output gear body 30, is provided separately from the transmitting gear 24 that is for transmitting rotational force to the output gear body 30. Due thereto, the amount of rotation of the output gear body 30 can be limited to a predetermined amount of rotation, while not being constrained by or while it is difficult to be constrained by the relationship between the transmitting gear 24 and the output gear body 30.

Here, in the present exemplary embodiment, the shapes and the dimensions of the first restricting portion 26C of the locking gear 26 and the second restricting portion 28E of the fixed gear 28, and the number of the outer teeth 26A of the locking gear 26, are set such that the amount of rotation (the rotational angle) of the output gear body 30 becomes a predetermined amount of rotation that is one rotation or more. In particular, in the present exemplary embodiment, the number of the outer teeth 26A of the locking gear 26 is set to a number that is greater than the number of the outer teeth 24A of the transmitting gear 24. Due thereto, the rotational frequency of the locking gear 26 at the time when the helical gear 20 and the eccentric shaft 22 rotate can be made to be lower than the rotational frequency of the transmitting gear 24. Due thereto, as compared with a case in which the number of the outer teeth 26A of the locking gear 26 is set to a number that is lower than the number of the outer teeth 24A of the transmitting gear 24, the rotational frequency of the output gear body 30, up until the first restricting portion 26C of the locking gear 26 abuts the second restricting portion 28E, can be made to be high. As a result, it can be made easy to limit the amount of rotation of the output gear body 30 to an amount of rotation that is one rotation or more. Note that, in a case of making it easy to limit the amount of rotation of the output gear body 30 to less than one rotation, it is good to set the number of the outer teeth 26A of the locking gear 26 to a number that is lower than the number of the outer teeth 24A of the transmitting gear 24.

(Optimal Structure for Ensuring Strength of First Restricting Portion 26C and Second Restricting Portion 28E)

An optimal structure for ensuring the strengths of the first restricting portion 26C and the second restricting portion 28E is described next.

Figure 5:
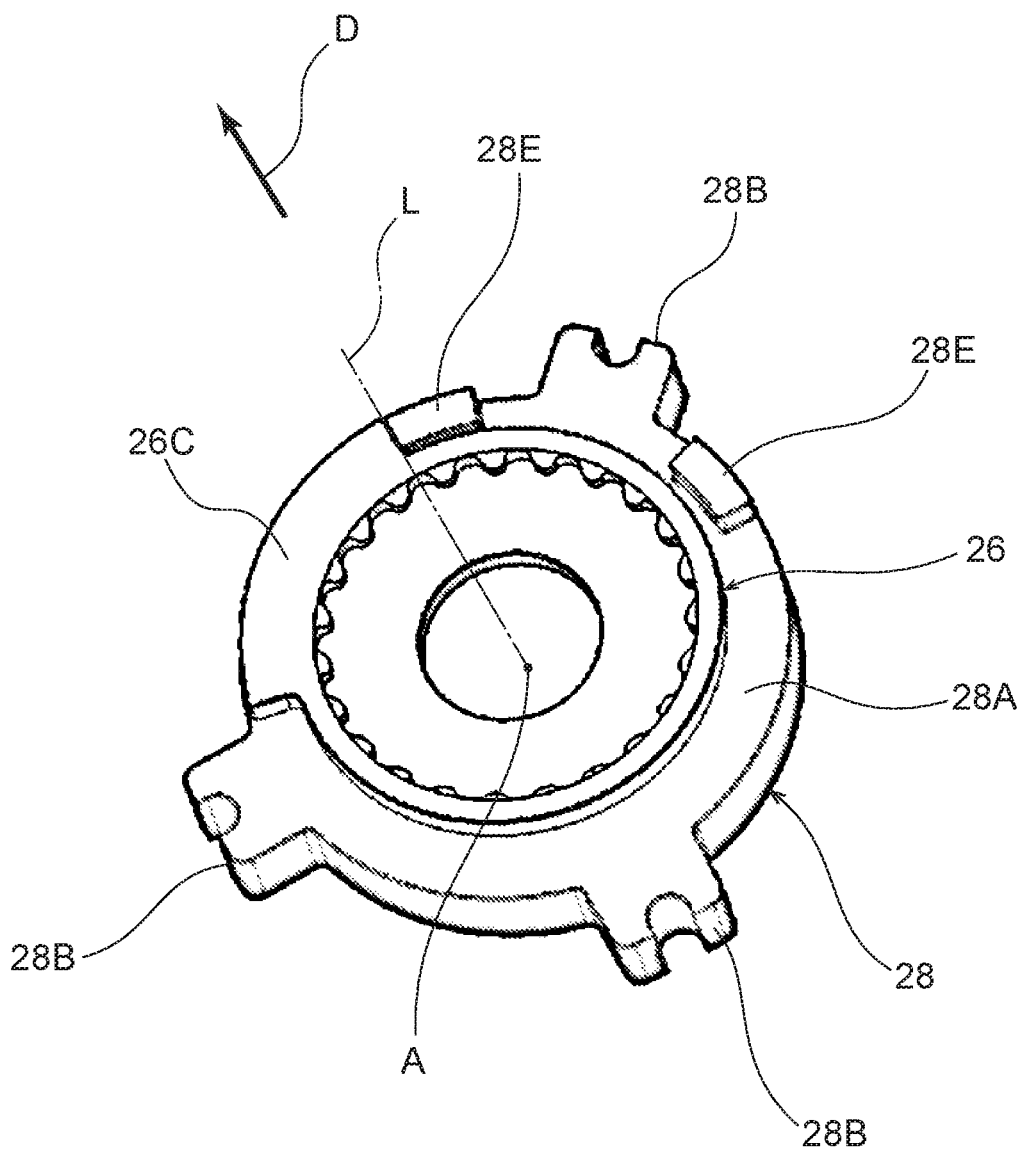
FIG. 5 is a perspective view showing the fixed gear and the transmitting gear that is engaged with the fixed gear.

By the way, the rotation of the rotation shaft 12A of the motor 12 is decelerated at the helical gear 20, the locking gear 26 and the fixed gear 28, and is transmitted to the first restricting portion 26C and the second restricting portion 28E. Therefore, at the time when the first restricting portion 26C abuts the second restricting portion 28E, large forces are applied to the abutting portions of the both. Thus, as shown in FIG. 5, it is good to make the first restricting portion 26C and the second restricting portion 28E abut one another at the offset direction D side. More preferably, it is good to make the first restricting portion 26C and the second restricting portion 28E abut one another on an extension (extension line L) of the offset direction D that passes-through rotation center A of the eccentric shaft 22 (the helical gear 20). In this case, it suffices to set the positions of the tips of the outer teeth 26A of the locking gear 26 or the tooth bottoms of the outer teeth 26A of the locking gear 26 (the centers of the outer tooth 26A and the outer tooth 26A that are adjacent to one another in the rotation peripheral direction) to be on the extension line L. In this structure, the surface area of contact between the first restricting portion 26C and the second restricting portion 28E can easily be ensured, and the strengths of the first restricting portion 26C and the second restricting portion 28E can easily be ensured.

Note that the above-described embodiment describes an example in which the second restricting portion 28E is provided at the locking gear 26, but the present disclosure is not limited to this. For example, a portion corresponding to the second restricting portion 28E may be provided at the housing 16 or the like.

Further, the above-described embodiment describes an example in which the outer teeth 24A of the transmitting gear 24 and the outer teeth 26A of the locking gear 26 are made to mesh with the inner teeth 28D of the fixed gear 28, but the present disclosure is not limited to this. For example, inner teeth with which the outer teeth 24A of the transmitting gear 24 mesh, and inner teeth with which the outer teeth 26A of the locking gear 26 mesh, may respectively be provided at the locking gear 26.

Second Exemplary Embodiment

Figure 6:
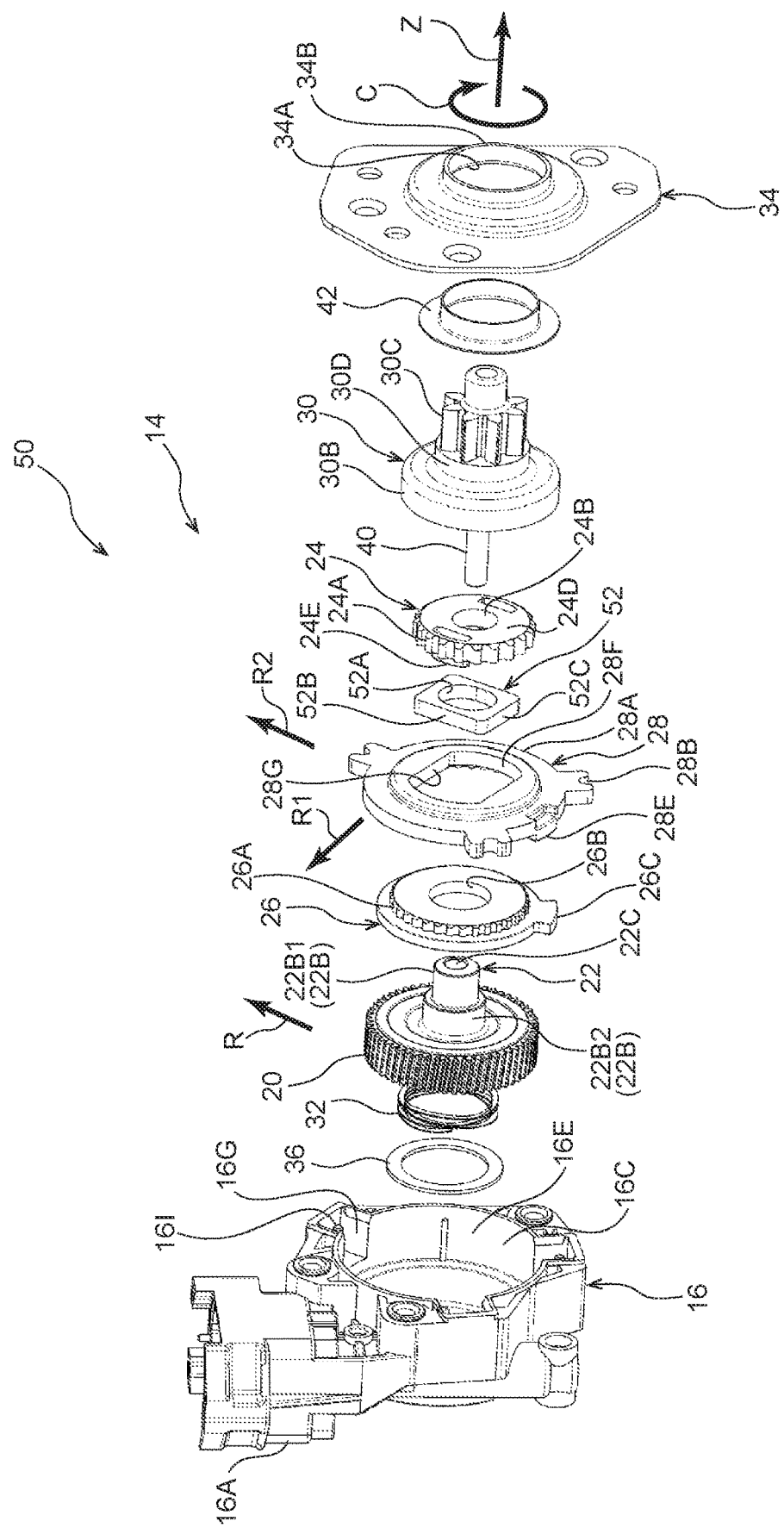
FIG. 6 is an exploded perspective view showing, in an exploded manner, a motor with a speed reducer relating to a second exemplary embodiment.
Figure 7:
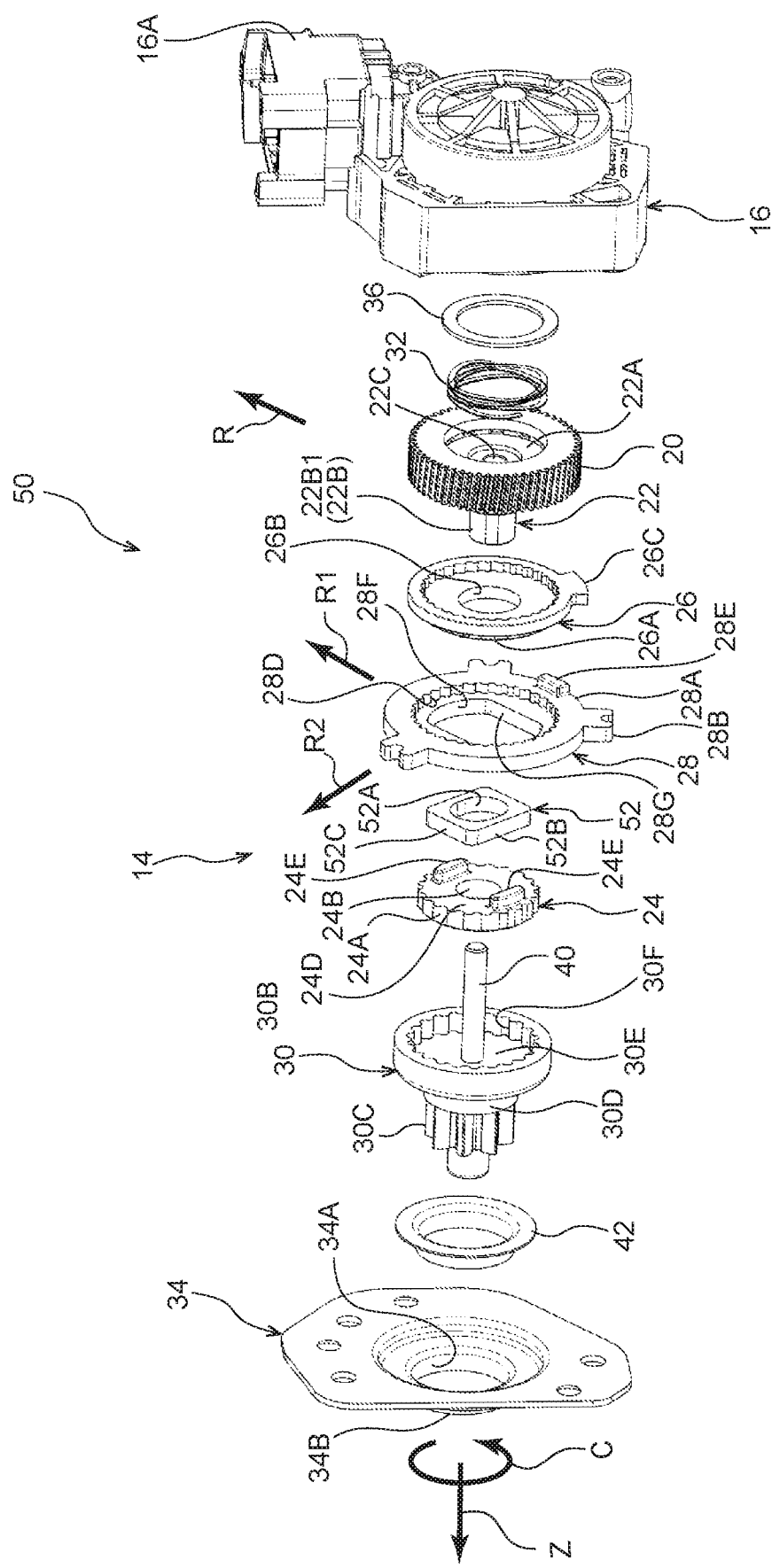
FIG. 7 is an exploded perspective view showing, in an exploded manner, the motor with a speed reducer of the second exemplary embodiment, and is a drawing that is seen from the side opposite FIG. 6.

A motor 52 with a speed reducer relating to a second exemplary embodiment of the present disclosure is described by using FIG. 6 and FIG. 7. Note that members and portions, which correspond to those of the motor 10 with a speed reducer of the above-described first exemplary embodiment, of the motor 52 with a speed reducer relating to the second exemplary embodiment are denoted by the same reference numerals as the corresponding members and portions of the motor 10 with a speed reducer relating to the first exemplary embodiment, and description thereof may be omitted.

As shown in FIG. 6 and FIG. 7, at the motor 52 with a speed reducer relating to the present exemplary embodiment, the outer teeth 24A of the transmitting gear 24 are meshed with inner teeth 30F that are formed at the output gear body 30. Further, in the state in which rotation (rotation around its own axis) of the transmitting gear 24 is limited by a slider plate 52 that serves as an own-axis-rotation limiting member, due to the transmitting gear 24 revolving, the output gear body 30 rotates.

The transmitting gear has a transmitting gear main body portion 24D at whose outer peripheral portion the plural outer teeth 24A are formed. Further, the transmitting gear 24 has two limiting projecting portions 24E that project-out toward the axial direction another side from the axial direction another side surface of the transmitting gear main body portion 24D. These two limiting projecting portions 24E are disposed at a uniform interval (a pitch of 180°) along the peripheral direction. Further, due to the two limiting projecting portions 24E being engaged with the slider plate 52 that is described later, rotation (rotation around its own axis) of the transmitting gear 24 around the first supporting portion 22B1 of the eccentric shaft 22 is limited.

An accommodating concave portion 30E, whose transmitting gear 24 side (axial direction another side) is open and at whose interior is disposed the transmitting gear main body portion 24D of the transmitting gear 24, is formed in the transmitting gear engaging portion 30B of the output gear body 30. The plural inner teeth 30F that mesh with the outer teeth 24A of the transmitting gear 24 are formed at the inner peripheral portion of the radial direction outer side of the accommodating concave portion 30E.

As shown in FIG. 1, the slider plate 52 is formed by using a plate material that is made of metal, and is formed in a rectangular shape as seen in the axial direction. Note that an insert-through hole 52A, through which the first supporting portion 22B1 of the eccentric shaft 22 is inserted, is formed in the axially central portion of the slider plate 52. This slider plate 52 is disposed between the two limiting projecting portions 24E of the transmitting gear 24, at the interior of a slider plate engaging hole 28F that is formed in the fixed gear 28 and that is described later. Further, at the outer peripheral portion of the slider plate 52, the surfaces, which are disposed so as to face the two limiting projecting portions 24E in the radial direction respectively, are engaged surfaces 52B. Further, in the state in which the slider plate 52 is disposed between the two limiting projecting portions 24E of the transmitting gear 24, displacement of the transmitting gear 24 with respect to the slider plate 52 in the direction in which the engaged surfaces 52B and the limiting projecting portions 24E face one another (one direction R1 in the radial direction) is limited, and rotation (rotation around its own axis) of the transmitting gear 24 with respect to the slider plate 52 is limited. Further, due to the limiting projecting portions 24E sliding on the engaged surfaces 52B, displacement of the transmitting gear 24 with respect to the slider plate 52 in the direction in which the engaged surfaces 52B and the limiting projecting portions 24E slide (another direction R2 in the radial direction that is orthogonal to the one direction R1 in the radial direction), is permitted. Further, the pair of surfaces, which are respectively disposed so as to face and be adjacent to the edge portion of the slider plate engaging hole 28F that is described later, at the outer peripheral portion of the slider plate 52 are first slider surfaces 52C.

The slider plate engaging hole 28F, whose edge portion is formed in a rectangular shape as seen in the axial direction and at whose interior the slider plate 52 is disposed, is formed in the axially central portion of the axial direction one side of the portion where the inner teeth 28D are formed at the fixed gear main body portion 28A of the fixed gear 28. Further, the surfaces, which are disposed so as to respectively face the pair of first slider surfaces 52C of the slider plate 52C in the radial direction, at the edge portion of the slider plate engaging hole 28F are second slider surfaces 28G. Further, due to the first slider surfaces 52C and the second slider surfaces 28G being disposed so as to face one another and be adjacent to one another, rotation of the slider plate 52 with respect to the fixed gear 28 is limited. Further, due to the first slider surfaces 52C sliding on the second slider surfaces 28G, displacement of the slider plate 52 and the transmitting gear 24 in the one direction R1 of the radial direction is permitted. Due thereto, at the time when the eccentric shaft 22 rotates, in the state in which rotation around its own axis of the transmitting gear 24 that is supported at the first supporting portion 22B1 of the eccentric shaft 22 is limited, the transmitting gear 24 revolves around the axial center of the rotation central shaft 40.

In accordance with the motor 52 with a speed reducer of the present exemplary embodiment that is described above, when the rotation shaft of an unillustrated motor rotates, the worm gear 18 rotates. Further, when the worm gear 18 rotates, the helical gear 20 that meshes with the worm gear 18 rotates together with the eccentric shaft 22.

Moreover, when the eccentric shaft 22 rotates, the transmitting gear 24, which is supported at the first supporting portion 22B1 of the eccentric shaft 22, revolves around the rotation central shaft 40. Further, when the transmitting gear 24 revolves, the rotational force that accompanies this revolving is transmitted from the outer teeth 24A of the transmitting gear 24 via the inner teeth 30F of the output gear body 30 to the output gear body 30. Due thereto, the output gear body 30 rotates, and the power seat of the vehicle can be operated via a gear that meshes with the pinion gear 30C of the output gear body 30.

Further, when the eccentric shaft 22 rotates, the locking gear 26, which is supported at the second supporting portion 22B2 of the eccentric shaft 22, revolves around the rotation central shaft 40 and rotates around its own axis while remaining meshed with the fixed gear 28. Further, when the first restricting portion 26C of the locking gear 26 abuts the second restricting portion 28E of the fixed gear 28, revolving and rotation around its own axis of the locking gear 26 are restrained. Due thereto, rotation of the eccentric shaft 22 and the helical gear 20 is stopped, and rotation of the output gear body 30 is stopped (rotation is restricted). As a result, excessive force being inputted from the motor 52 with a speed reducer to the vehicle seat is prevented or suppressed, and deterioration of the seating comfort due to members that structure the vehicle seat deforming, or the like, can be prevented or suppressed.

As described above, in accordance with the present exemplary embodiment, the locking gear 26, which is for limiting the amount of rotation of the output gear body 30, is provided separately from the transmitting gear 24 that is for transmitting rotational force to the output gear body 30. Due thereto, the amount of rotation of the output gear body 30 can be limited to a predetermined amount of rotation, while not being constrained by or while it is difficult to be constrained by the relationship between the transmitting gear 24 and the output gear body 30.

Further, in the present exemplary embodiment, both the locking gear 26, which is for limiting the amount of rotation of the output gear body 30, and the slider plate 52, which is for limiting the rotation of the transmitting gear 24 around its own axis, mesh with or engage with the single fixed gear 28. Due thereto, as compared with a case in which the locking gear 26 and the slider plate 52 are structures that mesh with respectively different fixed gears, the builds of the speed reducer 14 and the motor 10 with a speed reducer which is structured to include this speed reducer 14 can be made to be compact. Further, in the present exemplary embodiment, the transmitting gear 24 and the slider plate 52 are disposed in a state of being adjacent to and contacting one another in the axial direction. Due thereto, the builds of the speed reducer 14 and the motor 10 with a speed reducer that is structured to include this speed reducer 14, can be made to be even more compact.

Note that the speed reducer 14 that structures a portion of the motor 10 with a speed reducer of the above-described first exemplary embodiment and the motor 50 with a speed reducer of the second exemplary embodiment is a speed reducer to which a so-called planetary gear mechanism is applied. Therefore, it suffices to selected the gear, whose rotation is to be limited, appropriately in consideration of the reduction ratio required of the speed reducer 14, and the like. Namely, which structure among a planetary type, a solar type, or a star type is to be employed may be selected appropriately in consideration of the reduction ratio required of the speed reducer 14, and the like. Further, at the speed reducer 14 that structures a portion of the motor 50 with a speed reducer of the second exemplary embodiment, a KHV planetary gear mechanism is employed. Therefore, it suffices to select the gear, whose rotation is to be limited, appropriately in consideration of the reduction ratio required of the speed reducer 14, and the like. Namely, which structure among a 2K-H planetary gear mechanism, a 3K planetary gear mechanism, a wave gear mechanism, a ball speed reducer, a crown speed reducer and the like is to be employed may be selected appropriately in consideration of the reduction ratio required of the speed reducer 14, and the like.

Although exemplary embodiments of the present disclosure have been described above, the present disclosure is not limited to the above, and can of course be implemented by being modified in various ways other than the above with a scope that does not depart from the gist thereof.

The disclosures of Japanese Patent Application No. 2018-133039 filed on Jul. 13, 2018, Japanese Patent Application No. 2018-133040 filed on Jul. 13, 2018, Japanese Patent Application No. 2019-032134 0filed on Feb. 25, 2019, and Japanese Patent Application No. 2019-032135 filed on Feb. 25, 2019 are, in their entireties, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A speed reducer comprising:
a first gear that rotates due to rotational force being transmitted thereto;
an eccentric shaft joined to the first gear, the eccentric shaft having a first supporting portion and a second supporting portion that are offset in a rotation radial direction with respect to a rotation shaft of the first gear;
a fixed gear disposed at a radial direction outer side of the eccentric shaft, rotation of the fixed gear being restricted;
a transmitting gear that is supported at the first supporting portion and meshes with the fixed gear, wherein, due to the first gear rotating together with the eccentric shaft, the transmitting gear revolves around the rotation shaft of the first gear and rotates around its own axis;
an outputting portion that rotates due to the transmitting gear revolving and rotating around its own axis; and
a locking gear that is supported at the second supporting portion and meshes with the fixed gear, wherein, due to the first gear rotating together with the eccentric shaft, the locking gear revolves around the rotation shaft of the first gear and rotates around its own axis, and, due to revolving and rotation around its own axis of the locking gear being restrained, rotation of the outputting portion is restricted.

2. The speed reducer of claim 1, wherein the transmitting gear and the locking gear are disposed in a state of being adjacent to and contacting one another in a rotation axial direction of the first gear.

3. The speed reducer of claim 1, wherein:
an abutted portion abutted by a portion of the locking gear is provided at the fixed gear, and
revolving and rotation of the locking gear around its own axis are restricted due to the portion of the locking gear abutting the abutted portion.

4. The speed reducer of claim 1, wherein:
a convex portion, which projects out in a rotation axial direction of the outputting portion, is provided at one of the transmitting gear or the outputting portion,
a concave portion, with which the convex portion engages with a clearance therebetween, is provided at another of the transmitting gear or the outputting portion, and
the outputting portion rotates due to the transmitting gear revolving or rotating around its own axis in a state in which the convex portion and the concave portion are engaged.

5. The speed reducer of claim 1, further comprising:
a first restricting portion provided at the locking gear; and
a second restricting portion that, due to the first restricting portion abutting the second restricting portion, restricts revolving and rotation of the locking gear around its own axis.

6. The speed reducer of claim 5, wherein a number of teeth of the locking gear is set to a number that is greater than a number of teeth of the transmitting gear.

7. The speed reducer of claim 5, wherein a number of teeth of the locking gear is set to a number that is lower than a number of teeth of the transmitting gear.

8. The speed reducer of claim 5, wherein:
the second restricting portion is provided at the fixed gear, and
the first restricting portion and the second restricting portion abut at a side at which the second supporting portion is offset with respect to the rotation shaft of the first gear.

9. A motor with a speed reducer, comprising:
a motor having a rotation shaft;
a first gear that rotates due to rotational force of the rotation shaft being transmitted thereto;
an eccentric shaft joined to the first gear, the eccentric shaft having a first supporting portion and a second supporting portion that are offset in a rotation radial direction with respect to a rotation shaft of the first gear;
a fixed gear disposed at a radial direction outer side of the eccentric shaft, rotation of the fixed gear being restricted;
a transmitting gear that is supported at the first supporting portion and meshes with the fixed gear, wherein, due to the first gear rotating together with the eccentric shaft, the transmitting gear revolves around the rotation shaft of the first gear and rotates around its own axis;
an outputting portion that rotates due to the transmitting gear revolving and rotating around its own axis; and
a locking gear that is supported at the second supporting portion and meshes with the fixed gear, wherein, due to the first gear rotating together with the eccentric shaft, the locking gear revolves around the rotation shaft of the first gear and rotates around its own axis, and, due to revolving and rotation around its own axis of the locking gear being restrained, rotation of the outputting portion is restricted.

10. The motor with a speed reducer of claim 9, wherein the transmitting gear and the locking gear are disposed in a state of being adjacent to and contacting one another in a rotation axial direction of the first gear.

11. The motor with a speed reducer of claim 9, wherein:
an abutted portion abutted by a portion of the locking gear is provided at the fixed gear, and
revolving and rotation of the locking gear around its own axis are restricted due to the portion of the locking gear abutting the abutted portion.

12. The motor with a speed reducer of claim 9, wherein:
a convex portion, which projects out in a rotation axial direction of the outputting portion, is provided at one of the transmitting gear or the outputting portion,
a concave portion, with which the convex portion engages with a clearance therebetween, is provided at another of the transmitting gear or the outputting portion, and
the outputting portion rotates due to the transmitting gear revolving or rotating around its own axis in a state in which the convex portion and the concave portion are engaged.

13. The motor with a speed reducer of claim 9, further comprising:
a first restricting portion provided at the locking gear; and
a second restricting portion that, due to the first restricting portion abutting the second restricting portion, restricts revolving and rotation of the locking gear around its own axis.

14. The motor with a speed reducer of claim 13, wherein a number of teeth of the locking gear is set to a number that is greater than a number of teeth of the transmitting gear.

15. The motor with a speed reducer of claim 13, wherein a number of teeth of the locking gear is set to a number that is lower than a number of teeth of the transmitting gear.

16. The motor with a speed reducer of claim 13, wherein:
the second restricting portion is provided at the fixed gear, and
the first restricting portion and the second restricting portion abut at a side at which the second supporting portion is offset with respect to the rotation shaft of the first gear.

17. A speed reducer comprising:
a first gear that rotates due to rotational force being transmitted thereto;
an eccentric shaft joined to the first gear, the eccentric shaft having a first supporting portion and a second supporting portion that are offset in a rotation radial direction with respect to a rotation shaft of the first gear;
a fixed gear disposed at a radial direction outer side of the eccentric shaft, rotation of the fixed gear being restricted;
an own-axis-rotation limiting member engaged with a portion of the fixed gear;
a transmitting gear supported at the first supporting portion, rotation of the transmitting gear around its own axis being limited by being engaged with the own-axis-rotation limiting member, wherein, due to the first gear rotating together with the eccentric shaft, the transmitting gear revolves around the rotation shaft of the first gear;
an outputting portion that rotates due to the transmitting gear revolving; and
a locking gear that is supported at the second supporting portion and meshes with the fixed gear, wherein, due to the first gear rotating together with the eccentric shaft, the locking gear revolves around the rotation shaft of the first gear and rotates around its own axis, and, due to revolving and rotation around its own axis of the locking gear being restrained, rotation of the outputting portion is restricted.

18. The speed reducer of claim 17, wherein the transmitting gear and the locking gear are disposed in a state of being adjacent to and contacting one another in a rotation axial direction of the first gear.

19. The speed reducer of claim 17, wherein:
an abutted portion abutted by a portion of the locking gear is provided at the fixed gear, and
revolving and rotation of the locking gear around its own axis are restricted due to the portion of the locking gear abutting the abutted portion.

20. The speed reducer of claim 17, further comprising:
a first restricting portion provided at the locking gear; and
a second restricting portion that, due to the first restricting portion abutting the second restricting portion, restricts revolving and rotation of the locking gear around its own axis.

21. The speed reducer of claim 20, wherein a number of teeth of the locking gear is set to a number that is greater than a number of teeth of the transmitting gear.

22. The speed reducer of claim 20, wherein a number of teeth of the locking gear is set to a number that is lower than a number of teeth of the transmitting gear.

23. The speed reducer of claim 20, wherein:
the second restricting portion is provided at the fixed gear, and
the first restricting portion and the second restricting portion abut at a side at which the second supporting portion is offset with respect to the rotation shaft of the first gear.

24. A speed reducer comprising:
a first gear that rotates due to rotational force being transmitted thereto;

an eccentric shaft joined to the first gear, the eccentric shaft having a first supporting portion and a second supporting portion that are offset in a rotation radial direction with respect to a rotation shaft of the first gear;

a fixed gear disposed at a radial direction outer side of the eccentric shaft, rotation of the fixed gear being restricted;

a transmitting gear supported at the first supporting portion, wherein, due to the first gear rotating together with the eccentric shaft, the transmitting gear revolves around the rotation shaft of the first gear;

an outputting portion that rotates due to the transmitting gear revolving;

a locking gear that is supported at the second supporting portion and meshes with the fixed gear, wherein, due to the first gear rotating together with the eccentric shaft, the locking gear revolves around the rotation shaft of the first gear and rotates around its own axis, and, due to revolving and rotation around its own axis of the locking gear being restrained, rotation of the outputting portion is restricted;

a first restricting portion provided at the locking gear; and a second restricting portion that, due to the first restricting portion abutting the second restricting portion, restricts of the locking gear revolving and rotation around its own axis.

25. The speed reducer of claim 24, wherein the transmitting gear and the locking gear are disposed in a state of being adjacent to and contacting one another in a rotation axial direction of the first gear.

26. The speed reducer of claim 24, wherein:

an abutted portion abutted by a portion of the locking gear is provided at the fixed gear, and revolving and rotation of the locking gear around its own axis are restricted due to the portion of the locking gear abutting the abutted portion.

27. The speed reducer of claim 24, wherein a number of teeth of the locking gear is set to a number that is greater than a number of teeth of the transmitting gear.

28. The speed reducer of claim 24, wherein a number of teeth of the locking gear is set to a number that is lower than a number of teeth of the transmitting gear.

29. The speed reducer of claim 24, wherein:

the second restricting portion is provided at the fixed gear, and the first restricting portion and the second restricting portion abut at a side at which the second supporting portion is offset with respect to the rotation shaft of the first gear.

* * * * *